(12) United States Patent
Plastina et al.

(10) Patent No.: US 7,890,513 B2
(45) Date of Patent: Feb. 15, 2011

(54) PROVIDING COMMUNITY-BASED MEDIA ITEM RATINGS TO USERS

(75) Inventors: Daniel Plastina, Sammamish, WA (US); Edward T. Gausman, Bellevue, WA (US); John P. Mullally, IV, Seattle, WA (US); Michael Novak, Redmond, WA (US); Pradeep Jha, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 632 days.

(21) Appl. No.: 11/156,892

(22) Filed: Jun. 20, 2005

(65) Prior Publication Data

US 2006/0288041 A1    Dec. 21, 2006

(51) Int. Cl.
  *G06F 7/00*    (2006.01)
  *G06F 17/30*   (2006.01)
(52) U.S. Cl. ...................................... 707/748; 707/749
(58) Field of Classification Search .............. 707/104.1, 707/705, 736, 737, 748, 749, 758, 771; 705/10, 705/26
See application file for complete search history.

(56) References Cited

U.S. PATENT DOCUMENTS

| | | | |
|---|---|---|---|
| 5,583,576 A * | 12/1996 | Perlman et al. ............... | 725/28 |
| 5,616,876 A | 4/1997 | Cluts | |
| 5,749,081 A | 5/1998 | Whiteis | |
| 6,041,311 A | 3/2000 | Chislenko et al. | |
| 6,088,007 A * | 7/2000 | Shioya ........................ | 345/10 |
| 6,118,450 A | 9/2000 | Proehl et al. | |
| 6,248,946 B1 | 6/2001 | Dwek | |
| 6,438,579 B1 | 8/2002 | Hosken | |
| 6,453,336 B1 | 9/2002 | Beyda et al. | |
| 6,453,339 B1 | 9/2002 | Schultz et al. | |
| 6,505,160 B1 | 1/2003 | Levy et al. | |
| 6,526,411 B1 | 2/2003 | Ward | |
| 6,539,395 B1 | 3/2003 | Gjerdingen et al. | |
| 6,545,209 B1 | 4/2003 | Flannery et al. | |
| 6,605,770 B2 | 8/2003 | Yamane et al. | |
| 6,657,117 B2 | 12/2003 | Weare et al. | |
| 6,721,741 B1 | 4/2004 | Eyal et al. | |
| 6,748,395 B1 | 6/2004 | Picker et al. | |
| 6,760,721 B1 | 7/2004 | Chasen et al. | |
| 6,772,408 B1 | 8/2004 | Velonis et al. | |
| 6,941,324 B2 | 9/2005 | Plastina et al. | |

(Continued)

FOREIGN PATENT DOCUMENTS

EP    1189437 A1    3/2002

(Continued)

OTHER PUBLICATIONS

Rate Your Music, Frequently Asked Questions, 15 pp., http://rateyourmusic.com/faq/, Sep. 20, 2005.

(Continued)

*Primary Examiner*—Angela M Lie
(74) *Attorney, Agent, or Firm*—Senniger Powers LLP

(57) ABSTRACT

Methods, computer-readable media, and systems for providing a user with media item ratings based upon media item ratings of a community of related users. The user sends information about herself to the system. The system places the user in a community of users based upon the user information and provides media item ratings to members of the community based upon media item ratings by other community members.

17 Claims, 6 Drawing Sheets

U.S. PATENT DOCUMENTS

| | | |
|---|---|---|
| 6,947,922 B1 | 9/2005 | Glance |
| 7,043,525 B2 | 5/2006 | Tuttle et al. |
| 7,072,846 B1 | 7/2006 | Robinson |
| 7,092,992 B1 * | 8/2006 | Yu .......................... 709/206 |
| 2001/0025259 A1 * | 9/2001 | Rouchon ..................... 705/26 |
| 2001/0031066 A1 | 10/2001 | Meyer et al. |
| 2002/0001395 A1 | 1/2002 | Davis et al. |
| 2002/0033844 A1 | 3/2002 | Levy et al. |
| 2002/0041692 A1 | 4/2002 | Seto et al. |
| 2002/0055951 A1 | 5/2002 | Shigetomi et al. |
| 2002/0059370 A1 | 5/2002 | Shuster |
| 2002/0059584 A1 | 5/2002 | Ferman et al. |
| 2002/0069218 A1 | 6/2002 | Sull et al. |
| 2002/0082917 A1 * | 6/2002 | Takano ....................... 705/14 |
| 2002/0087565 A1 | 7/2002 | Hoekman et al. |
| 2002/0099737 A1 | 7/2002 | Porter et al. |
| 2002/0103920 A1 | 8/2002 | Berkun et al. |
| 2002/0113824 A1 | 8/2002 | Myers |
| 2002/0143976 A1 | 10/2002 | Barker et al. |
| 2002/0146235 A1 | 10/2002 | Watanabe et al. |
| 2002/0147728 A1 | 10/2002 | Goodman et al. |
| 2002/0157095 A1 | 10/2002 | Masumitsu et al. |
| 2002/0196976 A1 | 12/2002 | Mihcak et al. |
| 2003/0033420 A1 | 2/2003 | Eyal et al. |
| 2003/0036948 A1 * | 2/2003 | Woodward et al. ............ 705/10 |
| 2003/0045953 A1 | 3/2003 | Weare |
| 2003/0045954 A1 | 3/2003 | Weare et al. |
| 2003/0093793 A1 | 5/2003 | Gutta |
| 2003/0105870 A1 * | 6/2003 | Baum ......................... 709/228 |
| 2003/0120928 A1 | 6/2003 | Cato et al. |
| 2003/0135513 A1 | 7/2003 | Quinn et al. |
| 2003/0163399 A1 | 8/2003 | Harper et al. |
| 2003/0182100 A1 * | 9/2003 | Plastina et al. ................. 704/1 |
| 2003/0182254 A1 | 9/2003 | Plastina et al. |
| 2003/0182255 A1 | 9/2003 | Plastina et al. |
| 2003/0182315 A1 | 9/2003 | Plastina et al. |
| 2003/0221541 A1 | 12/2003 | Platt |
| 2003/0225777 A1 | 12/2003 | Marsh |
| 2003/0236582 A1 | 12/2003 | Zamir et al. |
| 2004/0002993 A1 | 1/2004 | Toussaint et al. |
| 2004/0006575 A1 | 1/2004 | Visharam et al. |
| 2004/0017997 A1 | 1/2004 | Cowgill |
| 2004/0059795 A1 | 3/2004 | Ramey |
| 2004/0060426 A1 | 4/2004 | Weare et al. |
| 2004/0064476 A1 | 4/2004 | Rounds |
| 2004/0086268 A1 | 5/2004 | Radha et al. |
| 2004/0088729 A1 * | 5/2004 | Petrovic et al. ............... 725/91 |
| 2004/0111360 A1 | 6/2004 | Albanese |
| 2004/0128308 A1 | 7/2004 | Obrador |
| 2004/0172593 A1 | 9/2004 | Wong et al. |
| 2004/0186993 A1 | 9/2004 | Risan et al. |
| 2004/0210533 A1 | 10/2004 | Picker et al. |
| 2004/0254659 A1 | 12/2004 | Bolas et al. |
| 2004/0260786 A1 | 12/2004 | Barile |
| 2004/0267693 A1 | 12/2004 | Lowe et al. |
| 2005/0021500 A1 | 1/2005 | Plastina et al. |
| 2005/0234958 A1 | 10/2005 | Sipusic et al. |
| 2005/0278726 A1 | 12/2005 | Cano et al. |
| 2006/0242106 A1 | 10/2006 | Bank |
| 2006/0247980 A1 * | 11/2006 | Mirrashidi et al. ............ 705/26 |
| 2006/0271989 A1 | 11/2006 | Glaser et al. |
| 2008/0288306 A1 * | 11/2008 | MacIntyre et al. .............. 705/7 |

FOREIGN PATENT DOCUMENTS

| | | |
|---|---|---|
| WO | 03023781 A1 | 3/2003 |

OTHER PUBLICATIONS

Edward Swierk, et al., The Roma Personal Metadata Service, Mobile Networks and Applications vol. 7, pp. 407-418, 2002.

MusicMatch, MusicMatch Jukebox User's Guide, Feb. 7, 2003, Chapters A1-A6 & 1-9.

S. Gutta et al., "Method and Apparatus for Generating Recommendation Scores Using Implicit and Explicit Viewing Preferences"; U.S. Appl. No. 09/666,401, filed Sep. 20, 2000.

* cited by examiner

Rating trends ────────────

Alternate treatments ────────────

PROVIDING COMMUNITY-BASED MEDIA ITEM RATINGS TO USERS

BACKGROUND

Due to recent advances in technology, computer users are now able to enjoy many features that provide an improved user experience, such as playing various media and multimedia content on personal, laptop, and handheld computers, as well as cellular phones and other portable media devices. For example, most computing devices today are able to play media items of various types for users to enjoy. These computing devices can readily access thousands of media items, making organizing such media items a formidable task. In addition, many such devices can capably access vendor-supplied media libraries containing many more media items. For example, a single user subscribing to a media service (e.g., a subscription service) may readily access over a million available media items. Such a subscription service may provide too many media item choices for some users to review and rate for personal use.

Conventionally, users can "star rate" their content, such as media content. In one such conventional example, users can assign a media item a rating of between one and five stars, or an unrated rating. This gives a user six rating options with respect to each media item. These ratings may then be used by the user to control playback of media items on his device. For example, a user may wish to play only those media items that are highly rated to experience only those media items considered favorites. If the media item is not specifically rated by the user, a rating of "unrated" is assigned to the media item. Rating options offer new dimensions of media selection to users. A relatively simple example of rating usage is creation of an auto-playlist called "My favorite songs" containing a query for media items rated with either four stars or five stars. Such queries enable what may be termed "pivoted views" on a set of media items. A user need no longer explore his media items by file name, but rather a user can pivot on the set of media items using metadata tags, such as star rating.

Conventional media players, such as Windows Media Player Version 10 by Microsoft Corporation of Redmond, Wash., are star-rating enabled, allowing for such automatic pivots based upon metadata tags. Such features are a useful tool for those users who put forth the effort required to rate their content. Unfortunately, many users do not invest the effort required to rank many of the media items to which they have access. Thus, a system or method capable of providing user ratings either automatically or more easily would have high value. One such co-owned patent disclosure related to this topic is patent application Ser. No. 10/622,971, entitled Effective Ratings for Media Content, filed Jul. 18, 2003. In one example, the rating of a media item was set to be the user's rating if it existed, or else an automatic rating computed by other data, such as media item playcount data. In other conventional systems, a "Service Rating Source" acting as an external service provider provides media item ratings to users. With such services, if a user trusts the ratings offered by the service, the perceived need to manually rate media items is reduced. A user relying upon a rating service may never invest the effort to manually rate media items themselves, yet reap all the benefits of pivots based upon media item ratings. Consider another example where a user has 300 old compact discs (CDs). The user can rip this collection of CDs into their computing device and, through the use of service ratings, all the less desirable media items are automatically rated as one star, while all the more desirable media items are rated as four or five stars. With no effort by the user, this library of several thousand media items may be quickly rated for use by the user.

Although the systems described above are beneficial to users, they may suffer from the following drawbacks, among others. First, a user may not agree with some of the ratings provided by the rating service provider, such that the provided ratings to not match the taste of the user. Second, the user may have little means to communicate his preferences to the service provider to alter present or future ratings provided by the service provider. Third, the ratings may remain largely unchanged over time, which may lead to a stale, stagnant listening experience.

Unfortunately, these issues are not adequately addressed by any conventional system. Conventional techniques provide only one rating for a particular media item. Such conventional techniques provide no ratings tailored to particular users. There is a need, therefore, for a system or method capable of providing ratings for users based upon information about the users that may be used to place the user in a particular community of users. In other words, the system or method may provide user ratings to the user that more closely align with what the user may have rated had he rated the media items himself. Providing community-based ratings based upon information relating to users and placing each user within a user community is desirable.

SUMMARY

The following simplified summary provides a basic overview of some aspects of the present technology. This summary is not an extensive overview. It is not intended to identify key or critical elements or to delineate the scope of this technology. This summary is not intended to be used as an aid in determining the scope of the claimed subject matter. Its purpose is to present some simplified concepts related to the technology before the more detailed description presented below.

Accordingly, a method (or a system) for providing a user with media item ratings based upon media item ratings of a community of related users is desired to address one or more of these and other disadvantages. For example, some embodiments of the invention may be well-suited for assisting users in rating large libraries of media items that may be wholly or partially unfamiliar to the user. Advantageously, some aspects of the present invention may allow a user to utilize ratings gathered from other users within his community of users, rather than having to review and rank media items to which he has access.

Other features will be in part apparent and in part pointed out hereinafter.

DETAILED DESCRIPTION

System for Providing Community-Based Media Item Ratings

Figure 1:
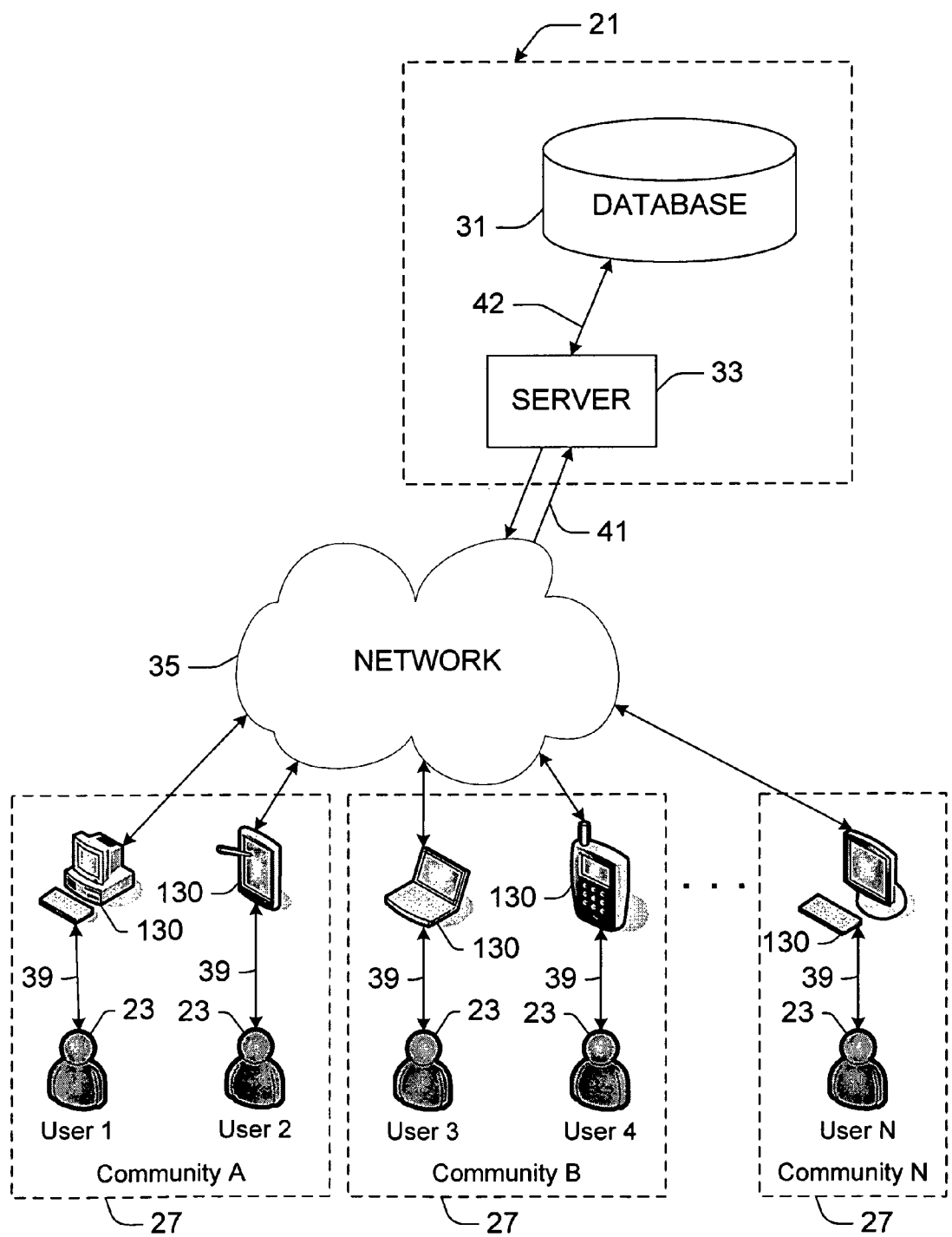
FIG. 1 is a diagram of a system of the present invention for providing community-based ratings of media items.

Referring now to FIG. 1, a system, generally indicated at 21, is disclosed for providing multiple users 23 with media item ratings based upon media item ratings of a community 27 of related users. As depicted in FIG. 1, User 1 and User 2 belong to Community A, User 3 and User 4 belong to Community B, and User N belongs to Community N. As would be readily appreciated by one skilled in the art, any number of communities 27 may be defined in other alternative embodiments without departing from the scope of the present invention. Once defined, each of those communities 27 may contain any number of users 23 without departing from the scope of the present invention. As used herein, the term media item comprises media files of multiple formats, including, music, speeches, audio books, news reports, movies, movie trailers, audio blogs, radio stations, television shows, images, and comedy routines, among others. In one example, the user 23 may utilize a media player program on a client computer 130 (see FIGS. 1 and 5) to access the media items. An example of such a media player is the Windows® Media Player by Microsoft Corporation of Redmond, Wash. As shown in FIG. 1, the term client, computer, client computer, or computing device, all designated 130, utilized by each user may comprise any number of different devices, including but not limited to personal, laptop, tablet, and handheld computers, as well as mobile phones and other portable media devices, among others.

The system 21 depicted in FIG. 1 comprises several components, including a database 31 and a server 33. The multiple users 23 are adapted for connection to the system 21 via a client 130 and the network 35. The client 130 is adapted for connection to the network 35 for presenting, at 39, each user 23 with a selection element for gathering user-related information via the network. The server 33 is also adapted for receiving, at 41, the user-related information from each respective user 23. The database 31 of the system 21 is adapted for connection, at 42, to the server 33 for storing the information from each of the users 23. The server is further configured to perform the following actions, among others, namely, categorize each user in a respective community, collect one or more user ratings of media items, store the collected one or more user ratings in the database, calculate a community rating for each rated media item, provide one or more of the calculated community ratings. The detailed operation of such a system 21 will be discussed in greater detail below with respect to the methods of the present invention, which may be employed on such a system, for example, or other systems not disclosed in detail herein, but readily understood by one skilled in the art as compatible with the methods discussed below. As would be readily understood by one skilled in the art, the aforementioned system 21 does not require the user 23 to be presently accessing the World Wide Web or other information source to use the system. The system 21 may be executed locally once one or more of the system actions has occurred, whereby the one or more users 23 may choose not to disclose or receive any additional information by not accessing the network 35 for a period.

Method for Providing a User with Community-Based Ratings

Figure 2:
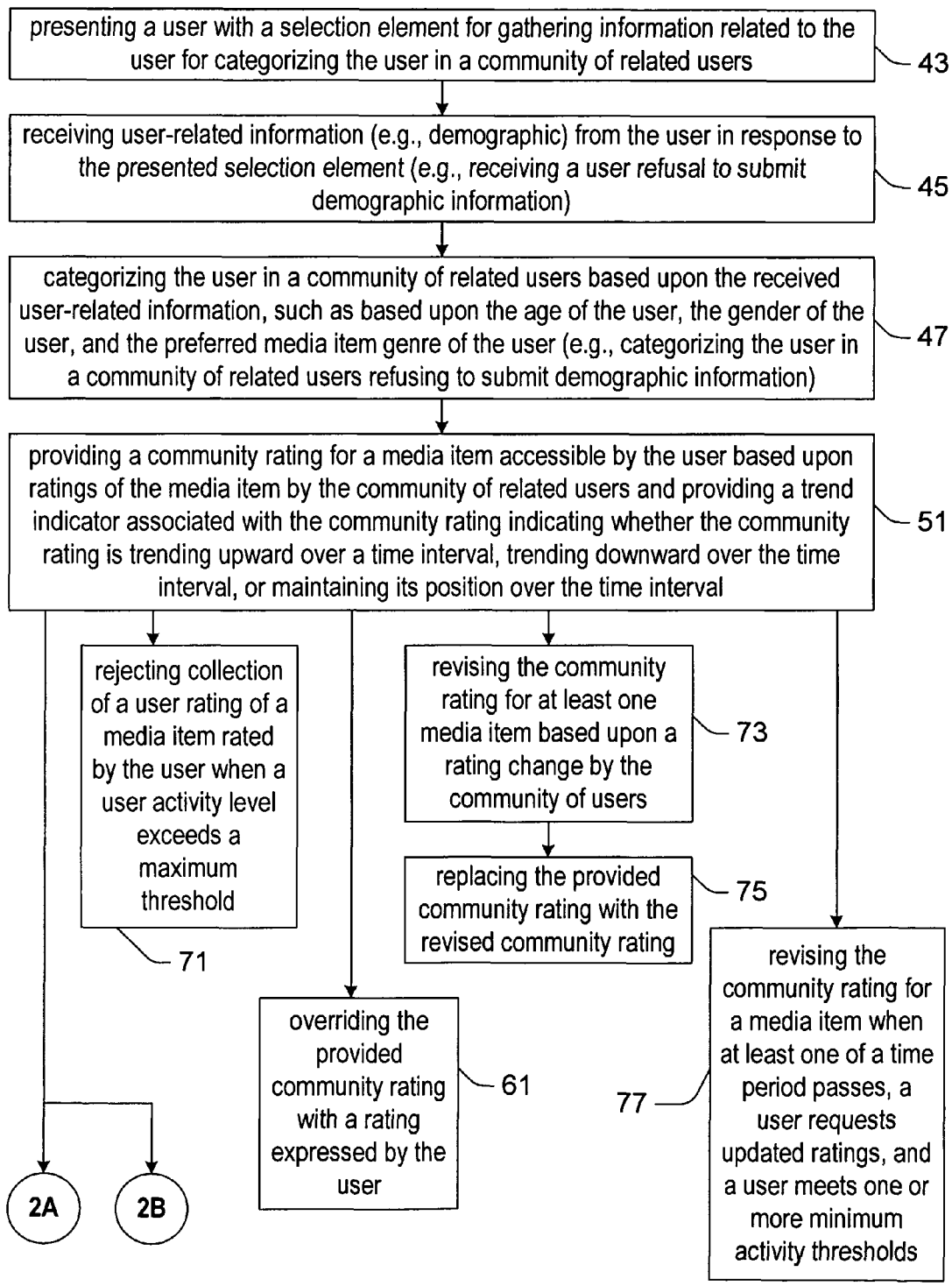
FIGS. 2-2B depict a flow diagram of a method of the present invention.
Figure 2A:
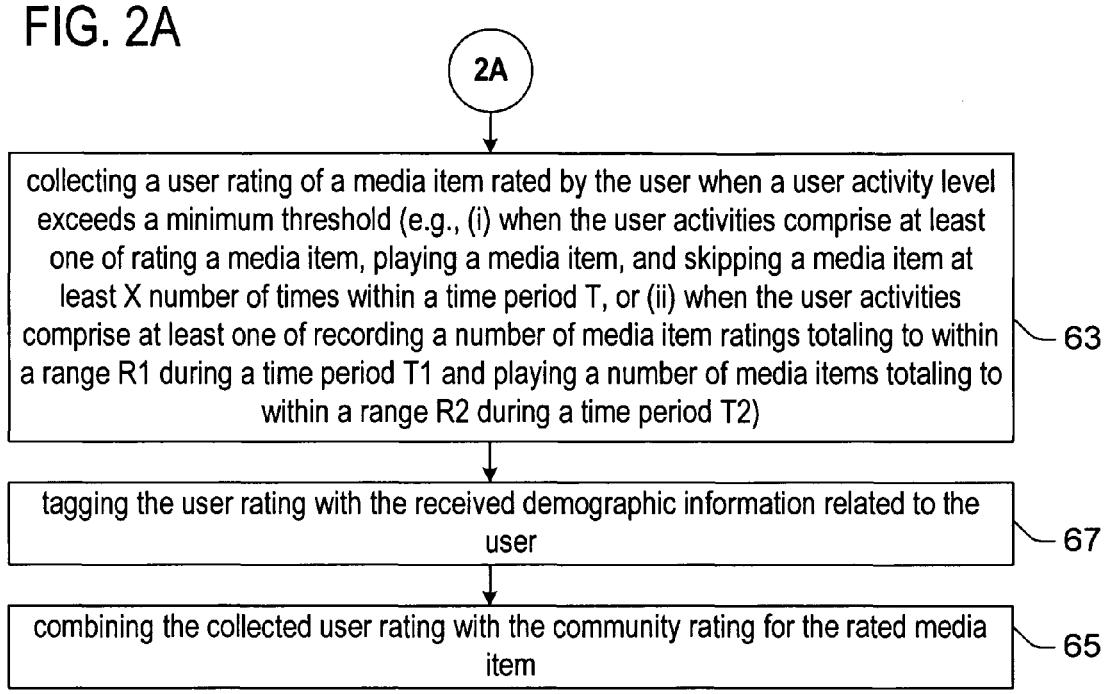
Figure 2B:
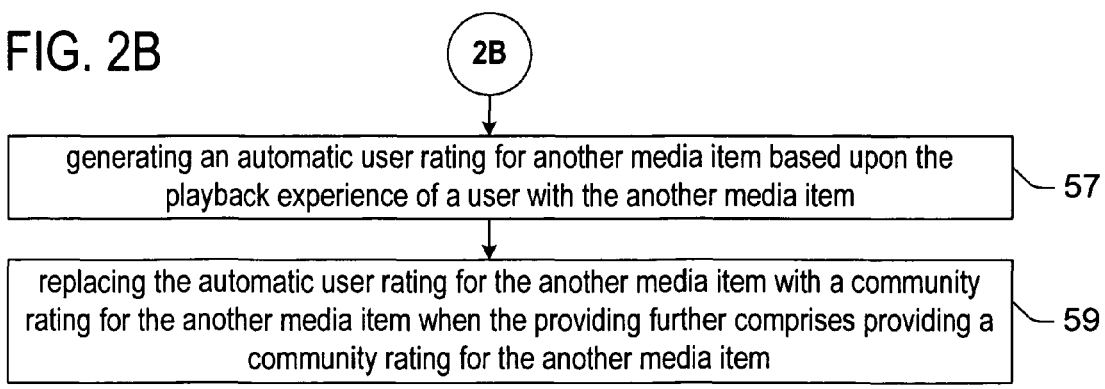

Referring now to FIGS. 2-2B, a method of the present invention is disclosed for providing users 23 with community media item ratings based upon individual media item ratings from individual members of a community 27 of related users. The method comprises presenting, at 43, a user 23 with a selection element for gathering information related to the user for categorizing the user in a community 27 of related users. Such information may be of any type related to the user 23. The method further comprises receiving, at 45, user-related information from the user 23 in response to the presented selection element. In one example, the information comprises demographic information related to the user 23. For example, such demographic information may include, but is not limited to, an age of the user, a gender of the user, a preferred media item genre of the user, a country of the user's residence, a mailing code of the user, a listening classification of the user, and a preferred language spoken by the user, among others. Any number of additional pieces of demographic information not specifically listed here may be received in other alternative embodiments without departing from the scope of the claimed invention. In one example, receiving demographic information may comprise receiving a user refusal to submit demographic information. In particular, categorizing such a user 23 comprises categorizing the user in a community 27 of related users refusing to submit demographic information. This flexibility allows different users 23 to disclose varying amounts of information to the ratings community. For example, this permits particular users 23 who are uncomfortable submitting even non-personally identifiable information to the system 21 to disclose no information to the ratings community, yet still be grouped in a community of other like-minded users not submitting any information for the aggregation of that group's rating information.

The method additionally categorizes, at 47, the user 23 in a community 27 of related users based upon the received user-related information. This categorization process is employed in order to place like-minded users 23 into a community 27 with others of a similar mind, without raising any privacy issues by sharing only non-personally identifiable information.

In one example, such categorizing may comprise categorizing the user 23 in a community 27 of related users based upon the age of the user, the gender of the user, and the preferred media item genre of the user. In this example, four age groups are invoked: ages 13-18 years, ages 19-26 years, ages 27-45 years, and ages 45 years and older. Two gender selections are also available, male or female, as well as the following seven preferred genres, of which one may be selected: (i) all genres (all types of music), (ii) easy listening (jazz, new age, folk, R&B, soul, vocal, country), (iii) mainstream pop/rock (pop, rock, alternative, rap, hip hop), (iv) heavier rock (metal), (v) classical, (vi) dance and electronica, and (vii) world. Once a user 23 has provided all three pieces of information, the user may be categorized with users answering similarly. Thus, for the three questions of the present example, each question having four, two, and seven possible responses, respectively, a total of fifty-six (4×2×7=56) user communities 27 are defined. In other words, each user 23 answering the three questions noted above will be categorized within a community 27 with other users answering the questions identically. This categorization should yield a population of similar users 23 in each community 27. In addition to the fifty-six communities 27 created by the three questions noted above, the present example also includes two standalone categories, namely, an under 13 year old community for users 23 identifying themselves as under 13 years of age and an undisclosed community for users not willing to provide one of an age, a gender, and a favored genre. The under 13 year old users 23 are placed into a separate standalone population in an effort to provide an age-appropriate experience for such users. These users 23 are not asked for a gender or a favored genre. This brings the total number of populations in this example to fifty-eight (56+2). Thus, each user 23 is now included in a community 27 with similar users, the importance of which will be discussed in detail below. This example is directed to musical media items, but it should be readily understood that the present invention may also be applied to other types of media items.

In another example, additional questions and answer choices are included, whereby a larger number of more specific communities 27 may be created. In particular, nine age groups may be invoked: undisclosed age, ages 6-12 years, ages 13-16 years, ages 17-23 years, ages 24-29 years, ages 30-39 years, ages 40-49 years, ages 50-59 years, ages 60 years and older. Two gender selections are also available, male or female. Preferred genres may be expanded to cover twenty, fifty, or any number of specific genres, of which users 23 may be able to choose more than one. Moreover, users may be asked to submit geographic location information (e.g., zip code, state, and/or city). Each user 23 may also be asked to categorize himself along a spectrum of user classes, for example, a media freak, an enthusiast, an active listener, or a passive listener, to name a few. As would be readily understood by one skilled in the art reviewing the remainder of this application, by requesting more user information and creating more communities 27, the computational requirements of the system 21 quickly increase. Thus, the system 21 must be tuned to create the appropriate number of communities 27 to ensure meaningful separation between populations, while not overwhelming the system computationally.

Once each user 23 is classified in a particular community 27, the method further provides, at 51, community ratings for at least one media item accessible by the user based upon ratings of the at least one media item by the community 27 of related users (see FIG. 2). It should be noted again that the present method contemplates providing ratings for a variety of different media items in other alternative embodiments, without departing from the scope of the claimed invention, including a musical media item, a speech media item, an audio book, a news report, a motion picture, a movie trailer, an audio blog, a radio broadcast, a television broadcast, an image, and a comedy routine, among others.

Figure 3:
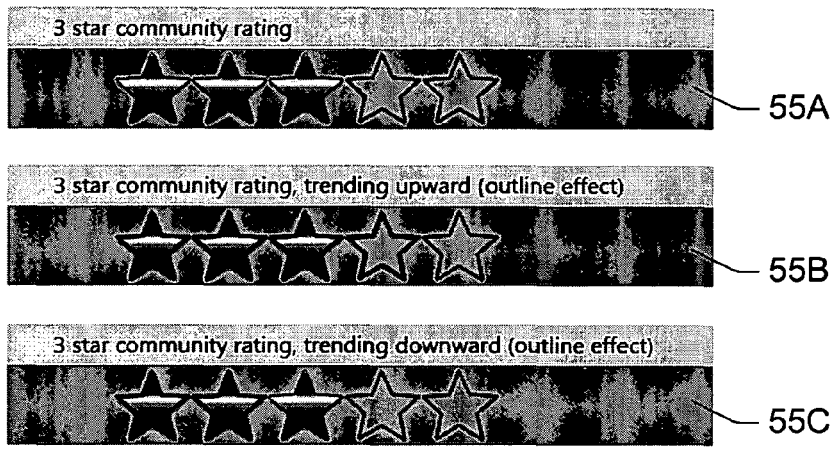
FIG. 3 depicts an exemplary user interface of the present invention.
Figure 3:
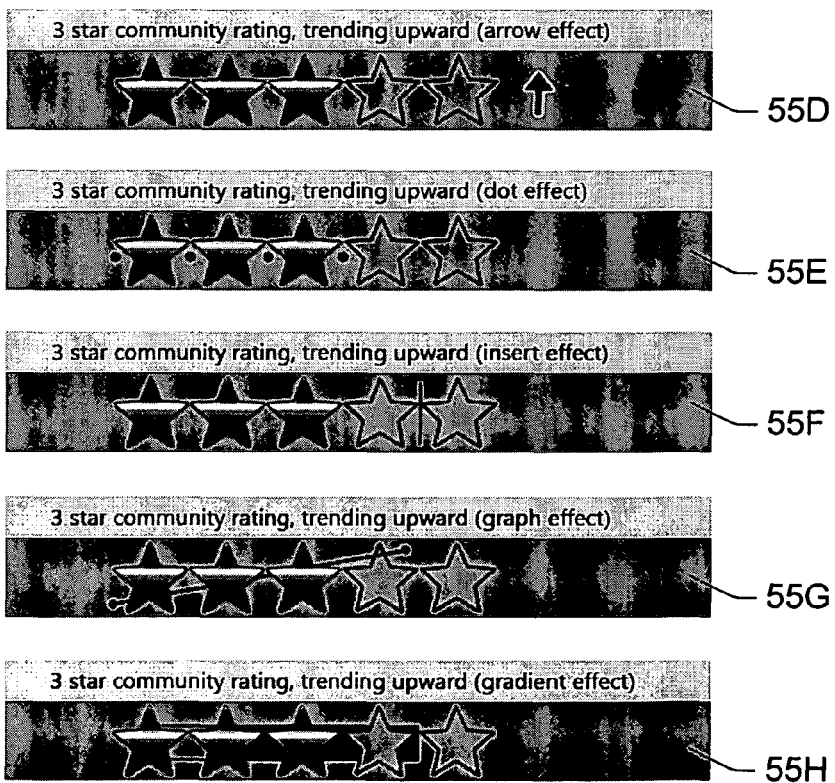

In one example, the providing may further comprise providing, also at 51, a trend indicator associated with the community rating indicating whether the community rating is trending upward over a time interval, trending downward over the time interval, or maintaining its position over the time interval. As shown in FIG. 3, this rating trend information may be communicated to the user 23 in any number of ways. For example, the first trend indicator 55A indicates a community rating of three out of four stars, with no information related to the trend of the rating. The second trend indicator 55B also indicates a rating of three out of five stars, but also includes a dark outline around four out of five stars, indicating that the community rating is trending upward from three stars to five stars. The third trend indicator 55C similarly indicates a rating of three out of five stars, while indicating that the community rating is trending downward because only two out of five stars include the dark outline. These three trend indicators 55A,55B,55C each indicate the same community rating, three stars, while also providing additional information regarding the direction the rating is trending. Other alternate trend indicators are also depicted in FIG. 3, including a fourth trend indicator 55D utilizing a trend arrow, a fifth trend indicator 55E utilizing alternate, repeating graphics (e.g., dots), a sixth trend indicator 55F utilizing a marker graphic to mark the trend pattern, a seventh trend indicator 55G utilizing a trend line, and an eighth trend indicator 55H including a gradient bar graphic. Other trend indicators utilized in other alternative embodiments are also contemplated as within the scope of the present invention.

In another example, the method may further generate, at 57, an automatic user rating for another media item based upon the playback experience of a user 23 with the another media item (see FIG. 2B). This conventional action allows unrated media items to be rated by the system 21 based upon user behavior alone, without additional effort by the user 23. With community ratings activated, however, the method may replace, at 59, the automatic user rating with a community rating for the media item. Where the user 23 expresses his own opinion by directly rating a media item, however, the method may override, at 61, the provided community rating with a rating expressed by the user about a particular media item (see FIG. 2). In this manner, a hierarchy of rating types is created, with direct user ratings replacing community ratings and community ratings replacing automated ratings. This hierarchy ensures that the system 21 employs the rating most likely to satisfy the user 23.

The system 21 also includes criteria for determining which user ratings will be utilized in preparing the community ratings. For example, a user 23 who only rarely rates media items may not be considered a helpful source for contribution to the community ratings. Thus, in one example, the method may additionally comprise collecting, at 63, a user rating of a media item rated by the user 23 when a user activity level exceeds a minimum threshold (see FIG. 2A). This ensures that users 23 are participating at some minimum, threshold level in the rating of media items on their media player. In this example, the method may also include combining, at 65, the collected user rating with the community rating for the rated media item so that the opinion expressed by the user 23 impacts the community rating. Ratings of users 23 not meeting this threshold will not be combined in the compilation of community ratings. The collecting the user rating of the media item rated by the user 23 may further comprise tagging, at 67, the user rating with the received demographic information related to the user. In other words, each rating by a particular user who is male, 35 years old, and prefers classical media items will be tagged as belonging to the male, ages 27-45, and classical genre community 27. An example of an XML file sent from the user 23 to the server 33 for determining user activity is included in Appendix A. Also included in Appendix A is an example of an XML file that the server 33 returns to the user 23 after receiving the aforementioned XML document. Such files are exemplary only and are not intended to be limiting.

In another example, the collecting of the user rating of the media item may further comprise collecting, also at 63, the user rating when the user activities comprise at least one of rating a media item, playing a media item, or skipping a media item at least X number of times within a time period T. This is an example of a more specific measure of user activity. For example, a user 23 may need to perform 500 actions of rating, playing, or skipping media items within a week to qualify as active enough for collection of user ratings by the system 21. Other amounts of activity required by other alternative embodiments are also contemplated as within the scope of the present invention.

In still another example of verifying adequate user activity, the collecting of the user rating of the media item may further comprise collecting, also at 63, the user rating when the user 23 activities comprise at least one of recording a number of media item ratings totaling to within a range R1 during a time period T1 and playing a number of media items totaling to within a range R2 during a time period T2. Such a requirement ensures that the user 23 in question is both actively rating and actively playing a sufficient number of media items. As would be appreciated by one skilled in the art, any number of activity requirements may be implemented without departing from the scope of the claimed invention.

Beyond determining what users are exhibiting adequate activity levels to merit rating collection, it is also important for the system 21 to minimize the collection of spoofed ratings, or multiple ratings from a user aimed at artificially affecting the community rating of a particular media item. In this example, the method may further comprise rejecting, at 71, collection of a user rating of a media item rated by the user 23 when a user activity level exceeds a maximum threshold (see FIG. 2). For example, the ratings of a user 23 rating all media items of a single artist as a five stars while rating all other media items as one star may be rejected as exceeding a maximum threshold. This user 23 is assumed to be spoofing the system 21 in an attempt to promote a particular group of media items over other media items. In other alternative embodiments, other triggers for determining excessive user activity may also be employed without departing from the scope of the claimed invention.

Moreover, in another example, the method may further comprise revising, at 73, the community rating for at least one media item based upon a rating change by the community of users and replacing, at 75, the provided community rating with the revised community rating (see FIG. 2). This updating of the community user rating ensures that the ratings remain up-to-date. In another example, the method revises, at 77, the community rating for a media item when at least one of a time period passes, a user requests updated ratings, and a user meets one or more minimum activity thresholds.

Computer-Readable Medium for Providing Community-Based Ratings

Figure 4:
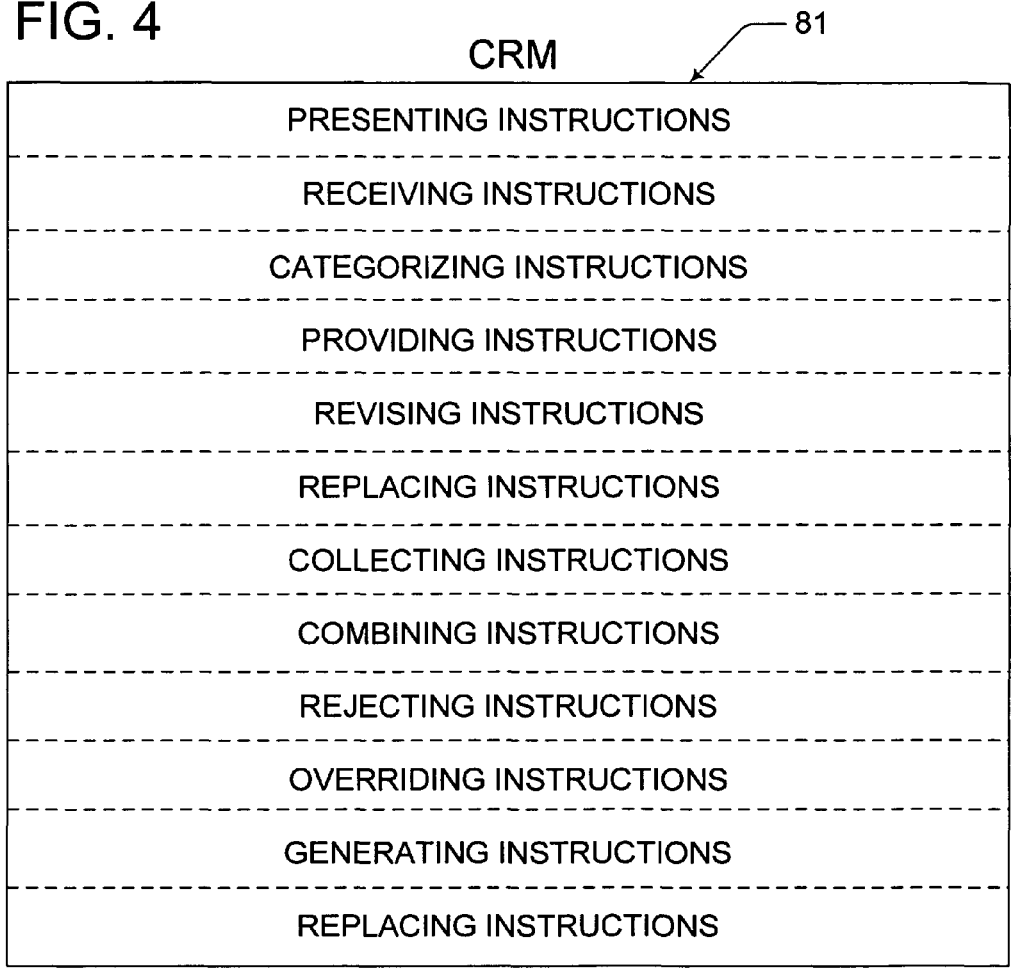
FIG. 4 is a diagram of a computer-readable medium (CRM) of the present invention.

Embodiments of the present invention may further comprise one or more computer-readable media, generally indicated 81 in FIG. 4, having computer-executable instructions for providing a user with media item ratings based upon media item ratings of a community of related users. In particular, the computer-executable instructions comprise presenting instructions for presenting a user with a selection element for gathering information related to the user for categorizing the user in a community of related users. The instructions also include receiving instructions for receiving user-related information from the user in response to the presented selection element and categorizing instructions for categorizing the user in a community of related users based upon the received user-related information. The instructions further include providing instructions for providing a community rating for a media item accessible by the user based upon ratings of the media item by the community of related users. In one example, the instructions include revising instructions for revising the community rating for the media item based upon a rating change by the community of users and replacing instructions for replacing the provided community rating with the revised community rating.

General Purpose Computing Device

Figure 5:
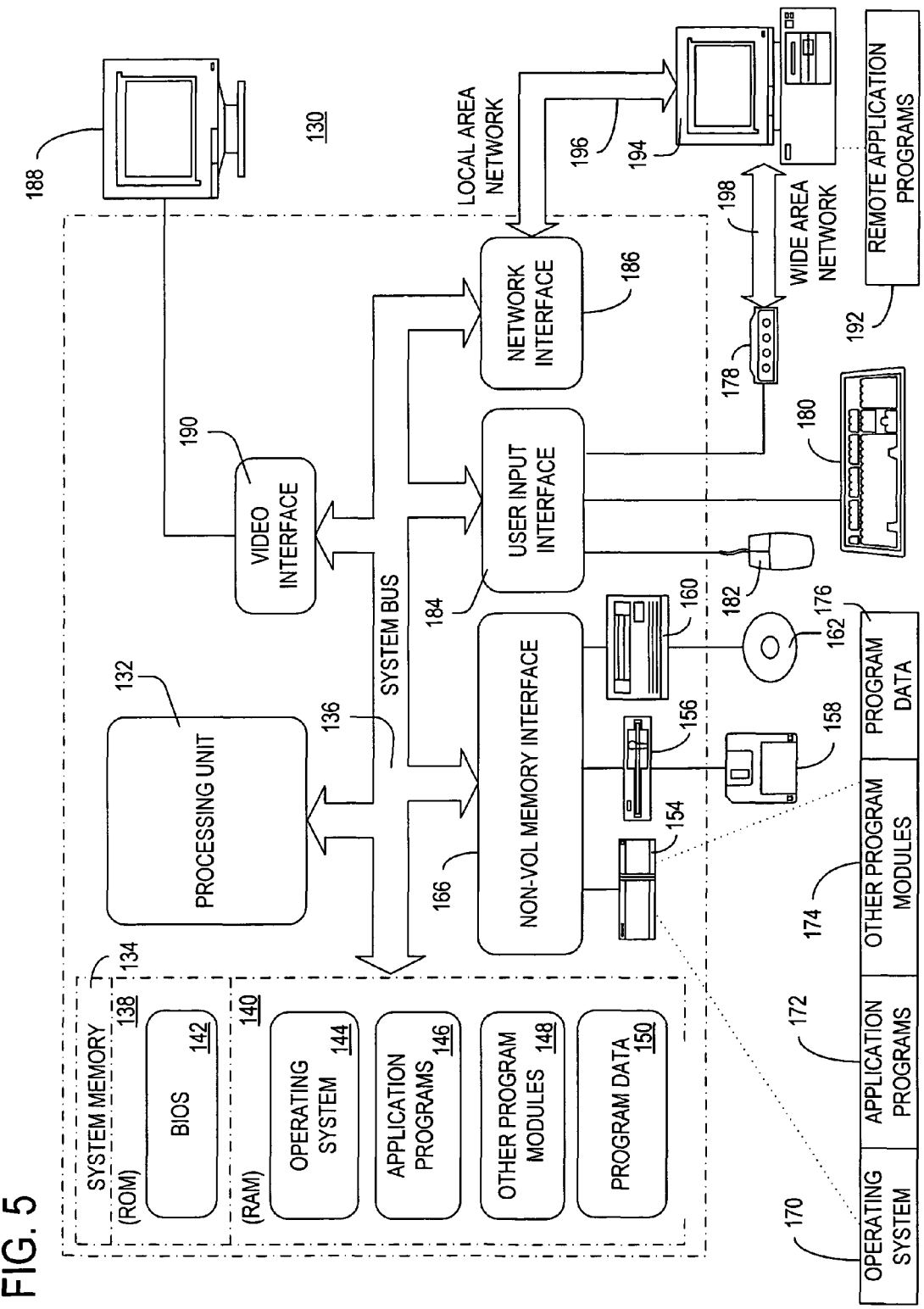
FIG. 5 is a block diagram illustrating one example of a suitable computing system environment in which the invention may be implemented.

FIG. 5 shows one example of a general purpose computing device in the form of a computer 130. In one embodiment of the invention, a computer such as the computer 130 is suitable for use in the other figures illustrated and described herein. In one example, the client, or user, computer or device discussed above may be embodied by computer 130. Computer 130 additionally has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. In one example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 5 illustrates operating system 144, application programs 146, other program modules 148, and program data 150.

The computer 130 may also include other removable/non-removable, volatile/nonvolatile computer storage media. In one example, FIG. 5 illustrates a hard disk drive 154 that reads from or writes to non-removable, nonvolatile magnetic media. FIG. 5 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 5, provide storage of computer readable instructions, data structures, program modules and other data for the computer 130. In FIG. 5, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, camera, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 5 include a local area network (LAN) 196 and a wide area network (WAN) 198, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 5 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, in one example, on floppy disks or CD-ROMs. From there, they are installed or loaded into the secondary memory of a computer. At execution, they are loaded at least partially into the computer's primary electronic memory. The embodiments of the invention described herein include these and other various types of computer-readable storage media when such media contain instructions or programs for implementing the operations described below in conjunction with a microprocessor or other data processor.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the embodiments of the invention are operational with numerous other general purpose or special purpose computing system environments or configurations. The computing system environment is not intended to suggest any limitation as to the scope of use or functionality of the embodiments of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

In operation, a computer 130 acting as the server 33 executes a method such as described above for providing a user with media item ratings based upon media item ratings of a community of related users. The computer 130 or its components presenting a user with a selection element for gathering information related to the user for categorizing the user in a community of related users. The computer or its components receiving user-related information from the user in response to the presented selection element. The computer or its components categorizing the user in a community of related users based upon the received user-related information. The computer or its components providing a community rating for a media item accessible by the user based upon ratings of the media item by the community of related users.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

---

APPENDIX A

---

RUS.xml is a sample XML file for the Ratings User Submissions document that the user 23 sends to the server 33.

```
- <RUS xmlns:xsi="http://www.w3.org/2001/XMLSchema-instance"
xsi:noNamespaceSchemaLocation="RUS.xsd">
        <A>2</A>
        <S>2</S>
        <G>5</G>
        <TP>5000</TP>
    - <T>
        <W>aaaaaaaa-aaaa-aaaa-aaaa-aaaaaaaaaaaa</W>
        <P>2000</P>
        <R>A</R>
        </T>
    - </T>
        <Partner>Napster</Partner>
        <Id>234556</Id>
        <P>3000</P>
        <R>B</R>
        </T>
    </RUS>
```

RUSR.xml is a sample XML file for the Ratings User Submission Response document that the server sends back to the client in response to the RUS.

```
<RUSR xmlns:xsi="http://www.w3.org/2001/XMLSchema-instance"
xsi:noNamespaceSchemaLocation="RUSR.xsd">
        <MinPlays>100</MinPlays>
        <MinRatings>10</MinRatings>
        <ElitePlays>1000</ElitePlays>
        <EliteRatings>100</EliteRatings>
        <MinDuration>P0Y0M7DT0H0M0S</MinDuration>
        <MaxDuration>P0Y0M30DT0H0M0S</MaxDuration>
    - <Throttle>
        <CBackoff>P0Y0M0DT0H2M0S</CBackoff>
        <MaxChunkSize>50</MaxChunkSize>
        </Throttle>
    </RUSR>
```

---

What is claimed is:

1. A method for providing a user with media item ratings based upon media item ratings of a community of related users, said method comprising:

presenting a user with a selection element for gathering demographic information related to the user for categorizing the user in a community of related users;

receiving a response to the selection element wherein the response includes at least one of information or a refusal, wherein the information comprises demographic information regarding the user from the user in response to the presented selection element, said demographic information including at least one of the following: an age of the user, a gender of the user, a country of the user's residence, a mailing code of the user, and a preferred language spoken by the user, and wherein the refusal includes receiving a user refusal to submit demographic information;

categorizing the user in a community of related users based upon said received user-related demographic information and based on demographic information of the community, wherein said categorizing the user comprises categorizing the user in a community of related users based upon the received demographic information relating to the user, and wherein said categorizing the user comprises categorizing the user in a community of related users when receiving the user refusal to submit demographic information;

determining a rating for a plurality of media items in a library of media items associated with said user based upon a community rating of each of said media item by said community of related users, wherein the community rating comprises one of at least three different values;

overriding at least one of the determined ratings with a rating expressed by the user, such that the value of the overridden determined rating is replaced with the rating expressed by the user; and visually presenting the determined rating to the user for each of the plurality of media items in the library of media items associated with said user, wherein the value of the determined rating of each of the plurality of media items is visually indicated to the user.

2. The method of claim 1 wherein categorizing the user comprises categorizing the user in a community of related users based upon an age of the user, a gender of the user, and a preferred media item genre of the user.

3. The method of claim 1 further comprising collecting a user rating of a media item rated by the user when a user activity level for the user exceeds a minimum threshold; and combining the collected user rating with the determined rating for said rated media item.

4. The method of claim 3 wherein collecting a user rating of a media item rated by said user further comprises tagging the user rating with the received demographic information regarding the user.

5. The method of claim 3 wherein collecting further comprises collecting the user rating when said user activities comprise at least one of rating a media item, playing a media item, and skipping a media item at least a predetermined number of times within a time period T.

6. The method of claim 3 wherein collecting further comprises collecting the user rating when the user's activities comprise at least one of recording a number of media item ratings totaling to within a range R1 during a time period T1 and playing a number of media items totaling to within a range R2 during a time period T2.

7. The method of claim 1 further comprising rejecting a rating of a media item expressed by the user when a user activity level for the user exceeds a maximum threshold.

8. The method of claim 1 wherein said visually presenting further comprises visually presenting a trend indicator associated with one of the determined ratings not overridden with a rating expressed by the user indicating whether the value of said determined rating is increasing over a time interval, decreasing over said time interval, or maintaining its value over said time interval, wherein said trend indicator is visually indicated to the user together with the value of said determined rating.

9. The method of claim 1 further comprising revising a determined rating for at least one of the media items based upon a rating change by the community of users; and
replacing said provided community rating with said revised community rating.

10. The method of claim 1 further comprising revising the value of a determined rating for at least one of the media items when at least one of a time period passes, a user requests updated ratings, and a user meets one or more minimum activity thresholds.

11. The method of claim 1 further comprising generating an automatic user rating for another media item based upon the playback experience of a user with said another media item; and
replacing said automatic user rating for said another media item with a determined rating for said another media item when said providing further comprises providing a determined rating for said another media item.

12. The method of claim 1 wherein said providing said determined rating for a media item comprises providing a determined rating for at least one of a musical media item, a speech media item, an audio book, a previously presented report, a motion picture, a movie trailer, an audio blog, a radio broadcast, a television broadcast, an image, and a comedy routine.

13. The method of claim 1 further comprising:
revising the value of the community rating for at least one of the media items based upon a rating change by the community of users; and
replacing the value of said provided community rating with said revised value.

14. A computer-readable storage medium having computer-executable instructions stored thereon for providing a user with media item ratings based upon media item ratings of a community of related users, said computer-executable instructions for performing steps comprising:
presenting instructions for presenting a user with a selection element for gathering demographic information regarding the user for categorizing the user in a community of related users;
receiving instructions for receiving a response to the selection element wherein the response includes at least one of information or a refusal, wherein the information comprises demographic information regarding the user from the user in response to the presented selection element, said demographic information including at least one of the following: an age of the user, a gender of the user, a country of the user's residence, a mailing code of the user, and a preferred language spoken by the user, and wherein the refusal includes receiving a user refusal to submit demographic information;
categorizing instructions for categorizing the user in a community of related users based upon said received user-related demographic information and based on demographic information of the community, wherein categorizing the user comprises categorizing the user in a community of related users based upon the received demographic information relating to the user, and wherein said categorizing the user comprises categorizing the user in a community of related users when receiving the user refusal to submit demographic information;
determining a rating for a plurality of media items in a library of media items associated with said user based upon a community rating of each of said media items by said community of related users, wherein the community rating comprises one of at least three different values;
overriding at least one of the determined ratings with a rating expressed by the user, such that the value of the overridden determined rating is replaced with the rating expressed by the user;
providing instructions for providing the determined rating to the user for each of a plurality of media items in a library of media items associated with said user, wherein the value of each rating of each of the plurality of media items is visually indicated to the user; and
visually presenting a trend indicator associated with one of the determined ratings not overridden with a rating expressed by the user, said trend indicator indicating whether the value of said determined rating is increasing over a time interval, decreasing over said time interval, or maintaining its value over said time interval, wherein said trend indicator is visually indicated to the user together with the value of said determined rating.

15. A system for providing multiple users with media item ratings based upon media item ratings of a community of related users, said multiple users adapted for connection to said system via a network, said system comprising:
a server adapted for connection to said network, said server adapted for receiving a response to a selection element wherein the response includes at least one of information or a refusal, wherein the information comprises demographic information from each respective user, wherein said demographic information from each respective user comprises demographic information regarding the user, said demographic information including the following: an age of the user, a gender of the user, a country of the user's residence, a mailing code of the user, and a preferred language spoken by the user, and wherein the refusal includes receiving a user refusal to submit demographic information; and
a database adapted for connection to the server for storing said demographic information from each of the users, wherein said server is further configured to:
categorize each user in a respective community of related users based upon said received user-related demographic information and based on demographic information of the community, wherein each user is categorized in a respective community of related users based upon the received demographic information relating to the user, and wherein said categorizing the user comprises categorizing the user in a community of related users when receiving the user refusal to submit demographic information;

collect one or more user ratings of media items in a library of media items associated with each of the users from one or more of said users;

tag the one or more collected user ratings with said received user-related demographic information received from the respective user rating the respective media item;

store said collected one or more user ratings in said database;

calculate a community rating for each rated media item based upon only those ratings collected from users belonging to said community, wherein the community rating comprises one of at least three different values; and visually present one or more of said calculated community ratings for the media items to one or more users sharing the community with the rating, wherein the value of each community rating of each of the plurality of media items is visually indicated to the one or more users of each community.

16. The system of claim 15 wherein the one or more calculated community ratings provided to the one or more users by the server each comprise a visual trend indicator associated with said community rating indicating whether the value of said community rating is increasing over a time interval, decreasing over said time interval, or maintaining its value over said time interval, wherein said trend indicator is visually indicated to the user together with the value of said community rating.

17. The system of claim 15 further comprising said server configured to:

revise the value of the community rating for at least one of the media items based upon a rating change by the community of users; and replace the value of said provided community rating with said revised value.

* * * * *